June 9, 1925.

J. H. FOX 1,541,635

APPARATUS FOR MAKING CORRUGATED WIRE GLASS

Filed Sept. 26, 1922    3 Sheets-Sheet 1

INVENTOR
John H. Fox.
James C. Bradley

June 9, 1925.

J. H. FOX

APPARATUS FOR MAKING CORRUGATED WIRE GLASS

Filed Sept. 26, 1922   3 Sheets-Sheet 2

1,541,635

INVENTOR
John H. Fox
James C. Bradley
atty

June 9, 1925.
J. H. FOX
1,541,635
APPARATUS FOR MAKING CORRUGATED WIRE GLASS
Filed Sept. 26, 1922
3 Sheets-Sheet 3

INVENTOR
John H. Fox
James C. Bradley
Atty.

Patented June 9, 1925.

1,541,635

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

APPARATUS FOR MAKING CORRUGATED WIRE GLASS.

Application filed September 26, 1922. Serial No. 590,638.

*To all whom it may concern:*

Be it known that I, JOHN H. FOX, a citizen of the United States, and a resident of Pittsburgh, in the county of Allegheny and State of Pennsylvania, have made a new and useful Invention in Apparatus for Making Corrugated Wire Glass, of which the following is a specification.

Figure 1:
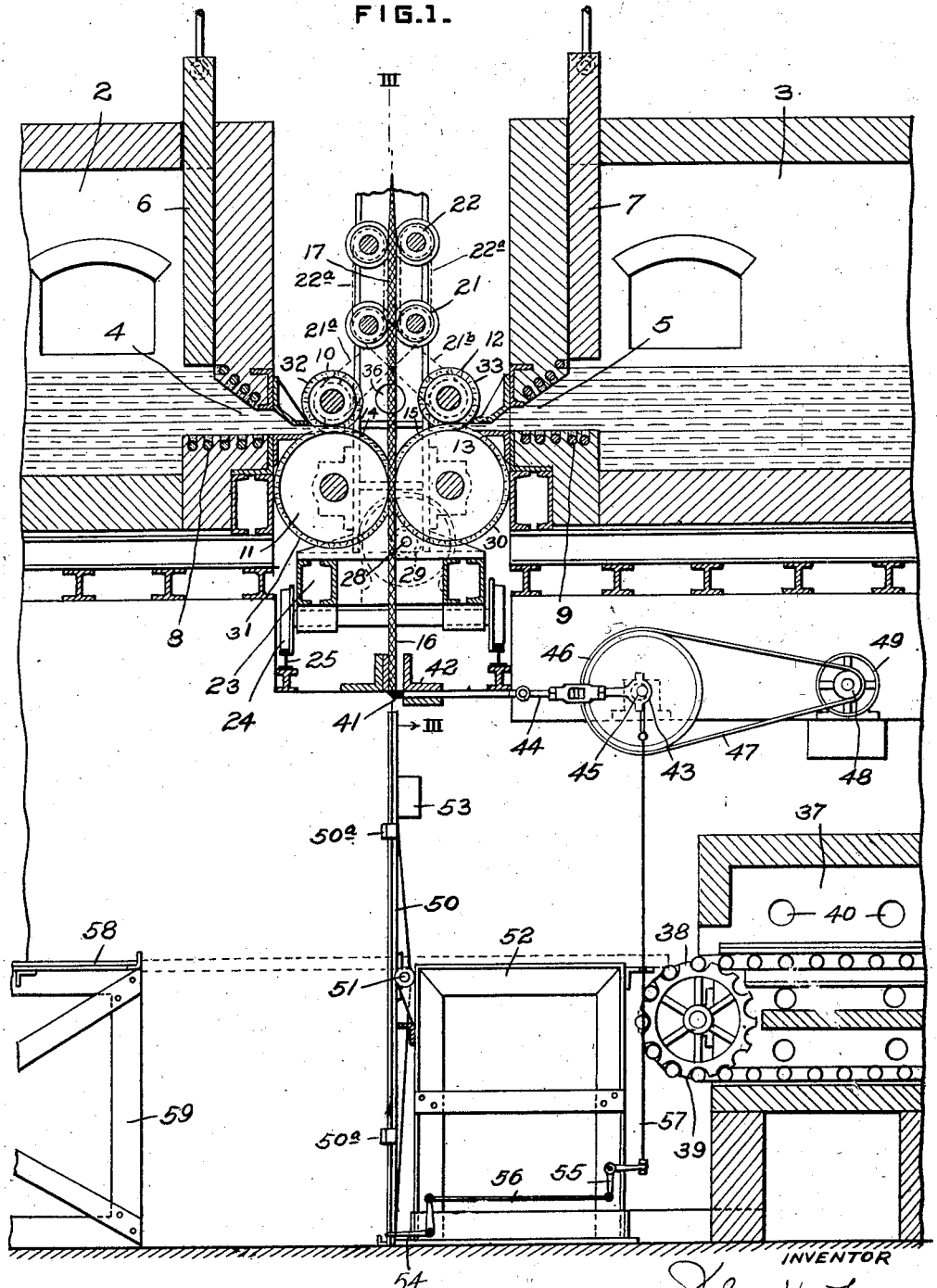
Figure 2:
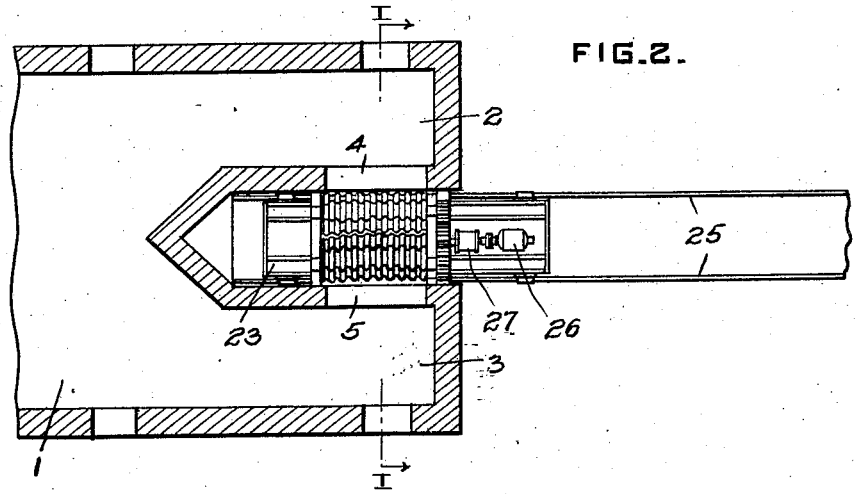
Figure 3:
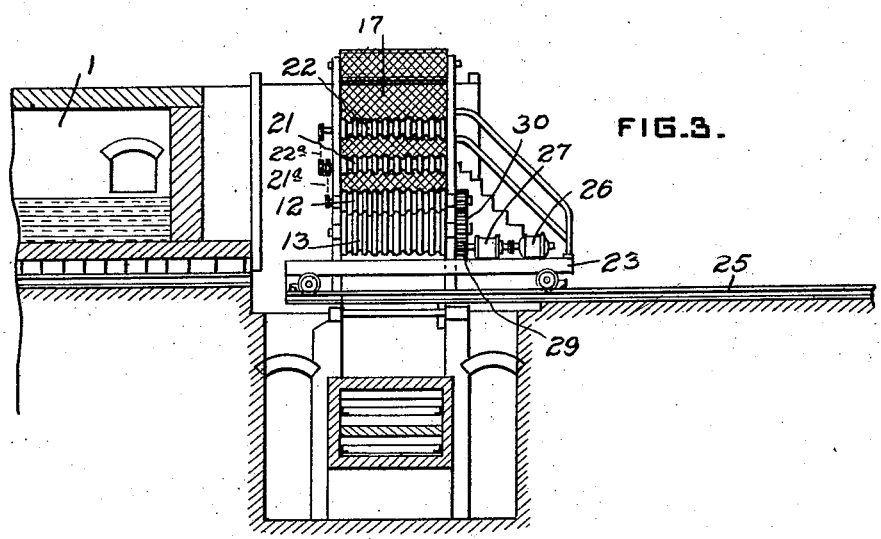
Figure 4:
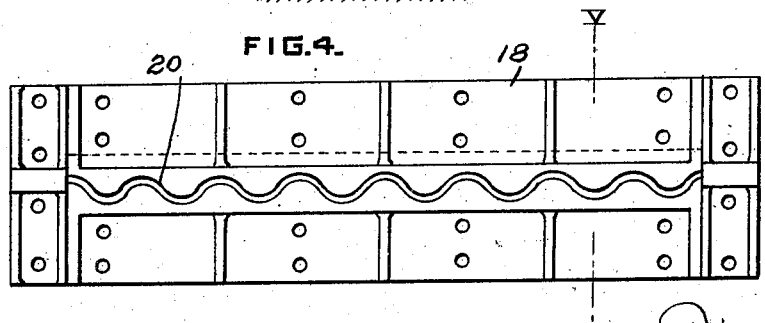
Figure 5:
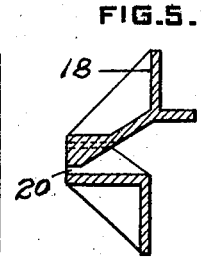
Figure 6:
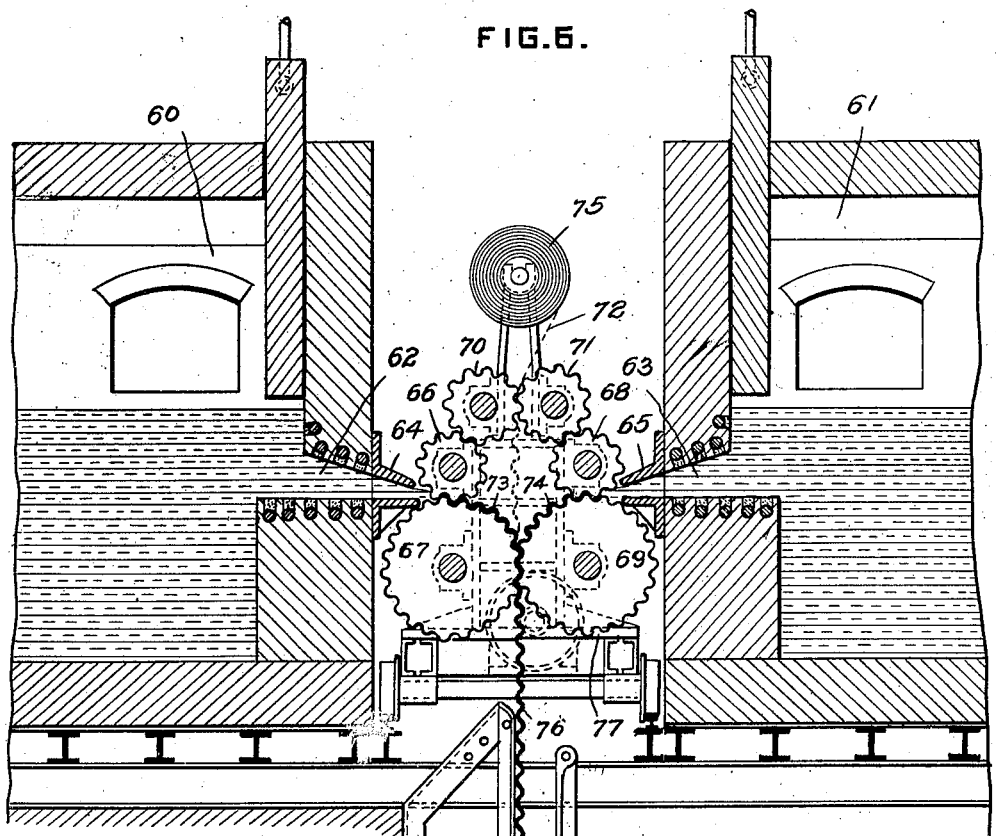
Figure 7:
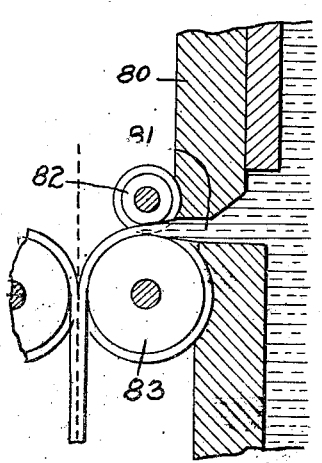

The invention relates to apparatus for making corrugated wire glass for use in tile for roofing or for any other purpose where glass of the additional strength incident to the corrugations is necessary or desirable. It has for its primary objects the provision of improved apparatus for making the product by a continuous operation more cheaply and rapidly than has been done heretofore, and for producing a product in which the wire or other reinforcing is applied at, and remains at, the neutral axis of the ribbon of glass produced. Certain embodiments of the invention are illustrated in the accompanying drawings wherein:

Figure 1 is a vertical section through the apparatus on the line I—I of Fig. 2; Fig. 2 is a partial horizontal section through the apparatus on a reduced scale, such section being taken at the level of the outlet slots; Fig. 3 is a vertical section on a reduced scale on the line III—III of Fig. 1; Fig. 4 is a front elevation of one of the outlet slots; Fig. 5 is a section on the line V—V of Fig. 4; Fig. 6 is a vertical section similar to that of Fig. 1 through a modified form of construction, and Fig. 7 is a section showing a modified slot construction.

Referring to Figs. 1, 2 and 3, 1 is a glass melting tank, preferably of the regenerative type, which is made at its forward end of U-shape in horizontal section (Fig. 3), in order to provide the two opposing drawing chambers 2 and 3 having the outlet slots or passages 4 and 5, preferably located below the level of the glass in the tank. Provision is made for shutting off the flow of glass through the passages, in the form of the vertical movable gates 6 and 7 suitably counterbalanced, and movable vertically by means which are not shown. In order to regulate the temperature of the glass flowing through the passages 4 and 5 and also to melt any glass which may solidify in these passages intermediate rolling operations, the resistance coils 8 and 9 are employed. These resistance coils are preferably of nichrome or other suitable material and are insulated and sealed in the grooves surrounding the passages 4 and 5 by means of refractory cement.

Opposite the outlet ends of the slots are the pairs of rolls 10 and 11 and 12 and 13, such rolls preferably being hollow and water cooled in order to chill the glass and prevent its sticking to the rolls. The glass ribbons 14 and 15 which are formed between the two sets of rolls are brought together in the vertical pass between the two lower rolls 11 and 13, where they are welded into the composite sheet 16, a suitable wire mesh 17 being fed into the space between the two sheets just before they are pressed together by the rolls 11 and 13. The passages 4 and 5 are provided at their outlet ends with the metal orifice members 18 and 19, which members are secured to the front walls of the furnace and are corrugated as indicated at 20 in Fig. 4, so that the glass from the orifice members is delivered to the rolls 10 and 11 and 12 and 13 in corrugated form, the faces of these rolls being correspondingly grooved or corrugated circumferentially. Above the rolls 10 and 12 are a series of corrugating rolls 21 and 22 corrugating the wire mesh 17, the rolls 21 being driven by sprocket chains 21ª and 21ᵇ from the rolls 10 and 12, and the rolls 22 being driven by sprocket chains 22ª from the rolls 21.

The rolling mechanism is mounted upon a truck 23 provided with the wheels 24 engaging the transversely extending track 25, so that the rolling apparatus may be made readily accessible by moving the truck laterally from between the furnace chambers 2 and 3. The truck also carries the motor 26 and speed reducing mechanism in the case 27, the shaft 28 of the speed reducing mechanism being provided with a pinion 29 engaging a spur gear 30 keyed to the shaft of the roll 13. The roll 11 is driven from the roll 13 by means of the spur gear 31 keyed to its shaft and meshing with the spur gear 30. The rolls 10 and 12 are also provided with spur gears 32 and 33 meshing with the spur gears 31 and 30, respectively.

In order to give additional heat, if necessary, a burner may be applied through the opening 36 in the side wall of the roll chamber.

Located beneath the furnace and extending laterally is a leer 37, such leer being of any desired form, but preferably comprising an endless belt 38 made up of metal plates carried upon suitable chains and passing around sprocket wheels at the end of the leer, one of which, 39 is illustrated. The metal plates constituting the belt may be corrugated to fit the corrugations of the glass sheets so the sheets will not flatten out under the high temperature of the leer and may even be trued up by these plates. The leer may be heated by any suitable means, the burner holes 40 being illustrated through which the necessary gas for heating may be introduced.

In order to transfer the glass from the rolling mechanism to the leer, it is preferably cut into sections before shifting from a vertical to a horizontal plane. In order to shear the glass, the corrugated shear member 41, carried upon the guide block 42 is employed, such shear member being operated from an eccentric 43 by means of the connecting rod 44. The shaft 45 of the eccentric also carries a fly wheel 46 to give the necessary inertia in the shearing operation, this wheel being driven by means of the belt 47 passing around the wheel and around the pulley wheel 48 of the motor 49. By the use of a suitable clutch (not shown), but of the type normally spring held in release position, the eccentric is connected with and disconnected from its shaft and the shear 41 is reciprocated at suitable intervals in order to cut off the desired lengths of glass.

In order to shift the glass from vertical to horizontal position, the tilting table 50 is employed, such table being pivoted at 51 to the framework 52 and having its lefthand side corrugated to fit the corrugated sheet which is fed downwardly from above against the vertical face of the table. The sheet of glass is held against falling away from the table by suitable clips 50ª at the edge of the table. The table is preferably very nearly balanced with a counterweight 53, so positioned with respect to the pivot 51, that the counterweight tends to hold the table in a vertical position shown until power is supplied to swing the upper end of the table to the right. The actuation of the shear device is accomplished by means of the bell crank levers 54 and 55 and the connecting rods 56 and 57. When the lower end of the sheet to be cut off engages the horizontal arm of the lever 54, the clutch heretofore referred to between the shaft 45 and eccentric 43, is actuated through the intermediary of the rods 56 and 57 and lever 55. The table is then swung around the pivot 51, bringing the table with the sheet of glass thereon into horizontal position, from which it may be readily stowed or moved into the leer by means of a stowing bar 58 slidably mounted upon the top of the table 59, the bar being at such time in alignment with the sheet of glass upon the surface of the table 50. The swinging of the table 50 to its horizontal position releases the horizontal arm of the lever 54, thus permitting the spring clutch to release, stopping the movement of the shear 41. After the glass has been shoved over the top of the table into the leer, the table is swung back into vertical position again and is ready to handle the next sheet.

The modification illustrated in Fig. 6 is designed to produce the corrugated wire glass in a continuous sheet which is not cut into sections until it emerges from the leer. The tank construction involving the opposing chambers 60 and 61 is the same as heretofore described in connection with Figs. 1, 2 and 3, such chambers being provided with the outlets 62 and 63 and with orifice members 64 and 65 which, in the present instance, are not corrugated as is the case in the construction of Fig. 1. In the present case the pairs of opposing rolls 66 and 67 and 68 and 69 are corrugated longitudinally instead of circumferentially, as is also the case with the rolls 70 and 71 through which the wire mesh 72 passes and which serves to corrugate such wire before its incorporation between the corrugated ribbons 73 and 74, it being understood that the corrugations of the wire mesh correspond to those of the ribbons. The wire mesh is supplied from the spool 75 and after its passage between the rolls 70 and 71 is fed between the glass ribbon 73 and 74, thus forming a composite sheet 76. The rolling mechanism and the motor therefor is supported upon the truck 77 which mechanism and the mechanism for driving the rollers correspond to that employed in the Fig. 1 construction, so that no further description is necessary. The sheet 76 is supported in its passage to the leer 78 by the curved guide chute 79, the leer being similar in construction to that of Fig. 1, and the sheet or ribbon preferably being cut into sections on its emergence from the leer.

Fig. 7 illustrates a further modification relating to the outlet or slot construction in which the metal orifice members 17 and 18 of the Fig. 1 apparatus are omitted as well as the electric heating coils 8 and 9. In this modified construction the end walls 80 have the outlet slots 81 discharging directly to the corrugated rolls 82 and 83, the faces of the walls 80 being corrugated to fit the corrugations on the rolls 82 and 83 and prevent a leakage of glass which might otherwise occur along the corrugations in the rolls. In other respects the apparatus may correspond to that of Fig. 1.

The device is capable of other modifications in matters of detail and otherwise. The cutter 41 shown is made to act rapidly, so that its interference with the continuous forward movement of the sheet is negligible, but other forms of cutter movable forward with the sheet or angularly to avoid any interference, as is well known in the art, might be substituted. Similarly as to the use of means other than the clips 50ª, such as rolls, for holding the sheet against the table 50, or as to the use of any other well known type of leer, such as one using corrugated rolls instead of the endless belts 38.

What I claim is:

1. A process of making wire glass which consists in continuously flowing two ribbons of glass so that they converge and meet, corrugating the sheeets during such movement, continuously corrugating a wire mesh, feeding it between the two ribbons as they meet and applying pressure to the outer faces of the ribbons to cause them to weld.

2. A process of making wire glass which consists in continuously flowing two ribbons of glass together from opposite directions so that they converge and meet, corrugating the ribbons during such movement, continuously corrugating a wire mesh and feeding it between the corrugated ribbons, causing the two ribbons to move through a vertical pass between two rolls where they are welded together with the wire mesh therebetween, and feeding the reinforced corrugated glass thus formed through a leer.

3. A process of making wire glass which consists in continuously flowing two ribbons of glass together from opposite directions so that they converge and meet, corrugating the ribbons longitudinally during such movement, continuously corrugating a wire mesh longitudinally and feeding it between the corrugated ribbons, causing the two ribbons to move through a vertical pass between two rolls, where they are welded together with the wire mesh therebetween, cutting the reinforced ribbon into sections as it is formed, turning the sections to horizontal positions and feeding them through a leer.

4. In combination in apparatus for making corrugated wire glass, a pair of opposing tank receptacles, each containing a bath of molten glass and provided with opposing lateral outlets, a pair of corrugated rolls extending longitudinally of the outlets in position to receive the glass therefrom and having a vertical pass through which the ribbons of glass passing over the rolls are directed and between which the ribbons are welded together, and means for corrugating a wire mesh to correspond to the corrugations of the ribbons and for feeding it between said ribbons.

5. In combination in apparatus for making corrugated wire glass, a pair of opposing tank receptacles each containing a bath of molten glass and provided with opposing lateral outlets, a pair of corrugated rolls opposite each slot to receive the glass therefrom with the lower rolls spaced so as to provide a vertical pass therebetween, and means for corrugating a wire mesh to correspond to the corrugations of the ribbons and for feeding it between said ribbons.

6. In combination in apparatus for making corrugated wire glass, a pair of opposing tank receptacles each containing a bath of molten glass and provided with opposing lateral outlets, a pair of rolls corrugated circumferentially opposite each slot to receive the glass therefrom with the lower rolls spaced so as to provide a vertical pass therebetween, and means for corrugating a wire mesh to correspond to the corrugations of the ribbons and for feeding it between said ribbons.

7. In combination in apparatus for making corrugated wire glass, a pair of opposing tank receptacles, each containing a bath of molten glass and provided with opposing lateral outlets, a pair of rolls corrugated circumferentially opposite each slot to receive the glass therefrom with the lower rolls spaced so as to provide a vertical pass therebetween, means for corrugating a wire mesh to correspond to the corrugations of the ribbons and for feeding it between said ribbons, means for cutting the ribbons into sections as it is formed, means for turning the sections to a horizontal position, and a leer in position to receive said section.

8. In combination in apparatus for making corrugated wire glass, a pair of opposing tank receptacles each containing a bath of molten glass and provided with opposing lateral, corrugated outlet slots, a pair of circumferentially corrugated rolls extending longitudinally of the outlets in position to receive the glass therefrom and having a vertical pass through which the ribbons of glass passing over the rolls are directed, and between which the ribbons are welded together, and means for feeding a corrugated wire mesh between said ribbons.

In testimony whereof, I have hereunto subscribed my name this 5th day of Sept., 1922.

JOHN H. FOX.